Nov. 7, 1933.  W. H. KITTO  1,933,628
BRUSH HOLDER

Filed March 12, 1932

INVENTOR.

WILLIAM H. KITTO.

ATTORNEY.

Patented Nov. 7, 1933

1,933,628

UNITED STATES PATENT OFFICE 1,933,628

BRUSH HOLDER

William H. Kitto, Canton, Ohio, assignor to The Hoover Company, North Canton, Ohio, a corporation of Ohio Application March 12, 1932. Serial No. 599,319

4 Claims. (Cl. 171—324)

The present invention relates generally to electric motors or generators and more particularly to a new and novel supporting and connecting means for commutator brushes forming a part of electric motors and generators.

It is an object of the present invention to provide a new and novel commutator-brush-supporting construction. It is another object to provide a simplified supporting and connecting means for a commutator brush in an electric motor or generator. A still further object is the provision, in an electric motor or generator, of a simplified commutator brush support and connector in which the commutator brush is readily and easily positioned and removed from the support. These and other more specific objects will appear upon reading the following specification and claims, and upon considering in connection therewith the attached drawing to which they relate.

In the drawing in which the same reference character refers to the same part throughout the various views.

Figure 1:
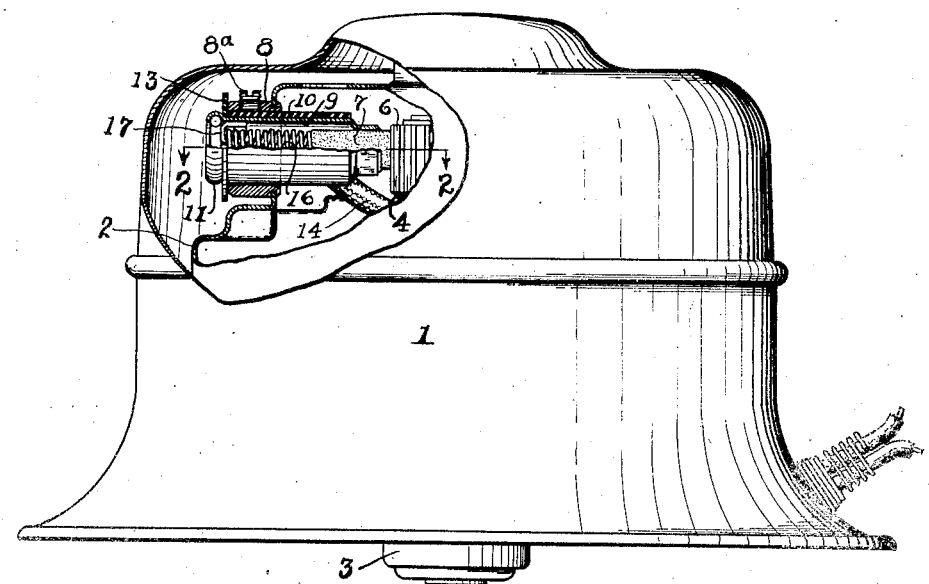
Figure 1 is a side elevation, partly in section, disclosing a preferred embodiment of the present invention in an electric motor.

Referring again to the drawing, and for the present to Figure 1 in particular, an electric motor is shown embodying the present invention. The motor comprises an outer casing 1 within which is positioned the motor frame 2, which maintains the parts of the motor in their assembled relation and which carries a lower bearing 3 in which is rotatably mounted the motor shaft 5 which carries the armature 4. Commutator 6 is positioned adjacent the armature and is contacted by a brush 7 for the purpose of conducting electric current thereto and therefrom. The present invention relates to the new and novel construction by which the motor brush 7 is carried by the motor frame 2 and the manner in which the power lead is connected to the brush.

Figure 2:
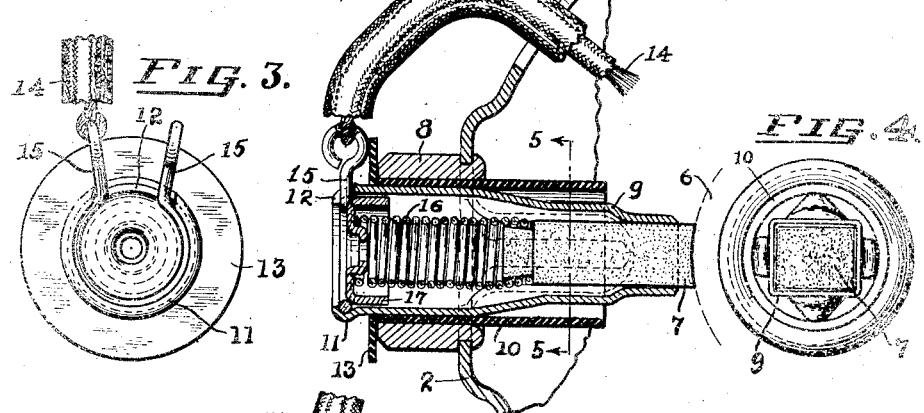
Figure 2 is an enlarged section upon the line 2—2 of Figure 1.
Figure 3:
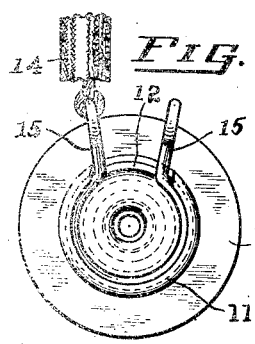
Figure 3 is an end view of the brush and support shown in Figure 2.
Figure 4:
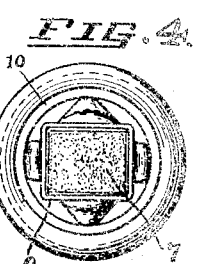
Figure 4 is an end view of the commutator end of the brush construction shown in Figure 2.
Figure 5:
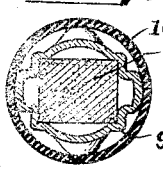
Figure 5 is a section looking in the direction of the arrows upon the line 5—5 of Figure 2.

In the motor frame opposite the commutator 6 is provided a seat or socket 8 having a cylindrical bore and within this bore is positioned the metallic brush holder 9 which is surrounded for a large part of its length, and entirely within the socket 8, by a relatively thin fiber sleeve member 10 whose function it is to insulate the holder from its seat and the remainder of the motor frame. The socket, sleeve and holder are held in fixed relationship by the screw 8a mounted radially in socket 8 and extending into the interior thereof. The outer end of the metallic holder 9 is cylindrical and is closely enclosed by the seat member, the fibrous sleeve only being positioned therebetween. The inner end of the holder member is smaller in size than the outer end, as is clearly seen in Figures 1 and 2, and is rectangular in shape so as to closely enclose and form a guide for the brush 7 which is slidingly positioned therein. The outer end of brush holder 9, at a point spaced slightly outside of socket 8, is provided with a bead 11 which comprises a portion of the holder which is expanded both internally and externally. A section of bead 11 is cut away at 12, as is clearly shown in Figure 3, for a purpose which will presently become apparent. Surrounding holder 9 immediately adjacent the end of socket 8 is a fiber washer 13 which functions to eliminate the possibility of a current-carrying member contacting the end of holder 9 and the seat 8.

The incoming motor lead 14 is secured at its end to a key or ring 15 formed of spring material and including a substantially circular main portion and two spaced arms which the operator can grasp and force together for the purpose of decreasing the diameter of the circular main portion. This circular main portion is of such size and shape that it closely seats, in a partially expanded condition, within the bead 11 of the metallic holder 9 from which position the operator can readily remove it in an obvious manner. When in position within the bead 11 the outwardly extending arms of key 15 extend through the cutout sector or opening 12 in the bead.

As in the usual brush construction a coil spring 16 is provided which seats against the outer end of brush 7 to exert a force to maintain contact between the inner end of the brush and the commutator surface. The outer end of the spring seats within a cup 17 which is circular in cross-section and of an external diameter substantially equal to the internal diameter of the outer portion of metallic holder 9, so that it can slide therein. The outward displacement of the cup 17 under the force exerted by the spring 16 is prevented by the key 15 when in place as that member extends inwardly to contact the top of the cup. To remove the brush 7 from the holder 9 it is only necessary for the operator to compress the arms of the key 15 thereby making it possible for the key to be withdrawn from the bead 11. Once the key 15 is removed the cup 17 is outwardly displaced under the force exerted by spring 16 and the operator can then grasp the spring 16 and withdraw the brush to which it is attached at its inner end.

Figure 6:
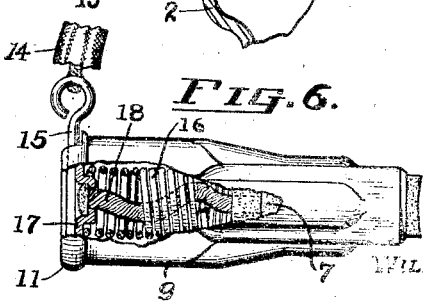
Figure 6 is a side elevation, partly in section, showing a slightly modified embodiment of the present invention.

In Figure 6 a construction substantially the same as that shown in Figures 1 to 5, inclusive, is shown, the principal difference lying in the fact that a "pig tail" 18 is provided between the outer end of brush 7 and the cup or cap 17, thereby preventing the entire disengagement of the spring, the cup and the brush, and also providing means to better conduct current from the cup 17 to the brush. In all other details the construction is the same as that aforedescribed.

I claim:

1. A mounting for a commutator brush including a frame, a seat in said frame, a metallic brush holder positioned in said seat, insulating means between said holder and said seat, a brush slidably carried in said holder, a cap in one end of said holder, a spring between said brush and said cap, said holder being formed with an interiorly expanded portion, and a manually compressible key expanded in said expanded portion and preventing the displacement of said cap.

2. A mounting for a commutator brush including a frame, a seat in said frame, an insulating sleeve in said seat, a metallic brush holder in said sleeve, a brush slidably positioned in a part of said holder, a cap slidably positioned in said holder, a spring between said cap and said brush, and cooperating means to prevent the displacement of said cap, said means comprising an interiorly and exteriorly expanded bead in said holder immediately adjacent said cap and a key of spring metal seated in said bead in its expanded condition but being compressible to a size less than the interior dimensions of said holder adjacent said bead to permit its removal, characterized by the fact that the current-carrying lead is connected to said key.

3. A mounting for a commutator brush including a frame, a seat in said frame, a metallic brush holder in said seat, insulating means between said holder and said seat, a brush slidably positioned in said holder, a cap slidable in said holder, a spring between said cap and said brush, an expanded bead in said holder immediately adjacent said cap having a cut-out sector, a resilient manually compressible key expanded in said bead and extending over said cap, said key including spaced arms extended through said cut-out sector, and a current-carrying lead connected to said key.

4. In a brush-holding construction, a brush holder adapted to slidingly seat a current-carrying brush and formed with a ring seat near one end, a cap in the open end of said holder adjacent said seat, and means to prevent the unintentional displacement of said cap through the open end of said holder, said means comprising a spring ring carried by a current-carrying conductor adapted to removably seat in said holder and restrict the internal dimensions thereof.

WILLIAM H. KITTO.